(12) United States Patent  
Maharyta et al.

(10) Patent No.: US 8,692,802 B1
(45) Date of Patent: Apr. 8, 2014

(54) METHOD AND APPARATUS FOR CALCULATING COORDINATES WITH HIGH NOISE IMMUNITY IN TOUCH APPLICATIONS

(71) Applicant: Cypress Semiconductor Corporation, San Jose, CA (US)

(72) Inventors: Andriy Maharyta, Lviv (UA); Vasyl Mandziy, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 14/095,902

(22) Filed: Dec. 3, 2013

Related U.S. Application Data

(60) Provisional application No. 61/859,969, filed on Jul. 30, 2013.

(51) Int. Cl.
*G06F 3/045* (2006.01)
(52) U.S. Cl.
USPC ...... 345/174; 345/173; 178/18.01; 178/18.06
(58) Field of Classification Search
USPC ...................... 345/173–175; 178/18.01–18.11
See application file for complete search history.

(56) References Cited

U.S. PATENT DOCUMENTS

2008/0157893 A1* 7/2008 Krah .......................... 331/177 R
2008/0158169 A1* 7/2008 O'Connor et al. ............ 345/173
2011/0285654 A1* 11/2011 Park et al. .................... 345/173

OTHER PUBLICATIONS

Naidu, D.K., et al. "A Comparative Analysis of Algorithms for Determining the Peak Position of a Stripe to Sub-pixel Accuracy," Department of Artificial Intelligence, University of Edinburgh, 1991. 9 pages.

* cited by examiner

*Primary Examiner* — Koosha Sharifi-Tafreshi

(57) ABSTRACT

Apparatuses and methods of position calculation of a touch are described. One method obtains at a processing device touch data of a sense array, the touch data represented as multiple cells. The touch data is for a touch detected proximate the sense array. Noise may be detected on the sense array based on the touch data and a position calculation algorithm from multiple different position calculation algorithms is selected based on the detected noise. The position of the touch proximate the sense array is determined from the touch data based on the selected position calculation algorithm.

20 Claims, 9 Drawing Sheets

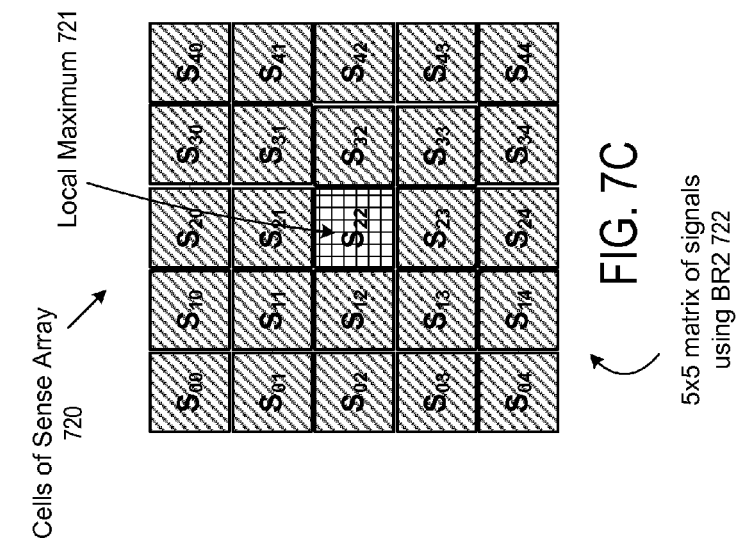
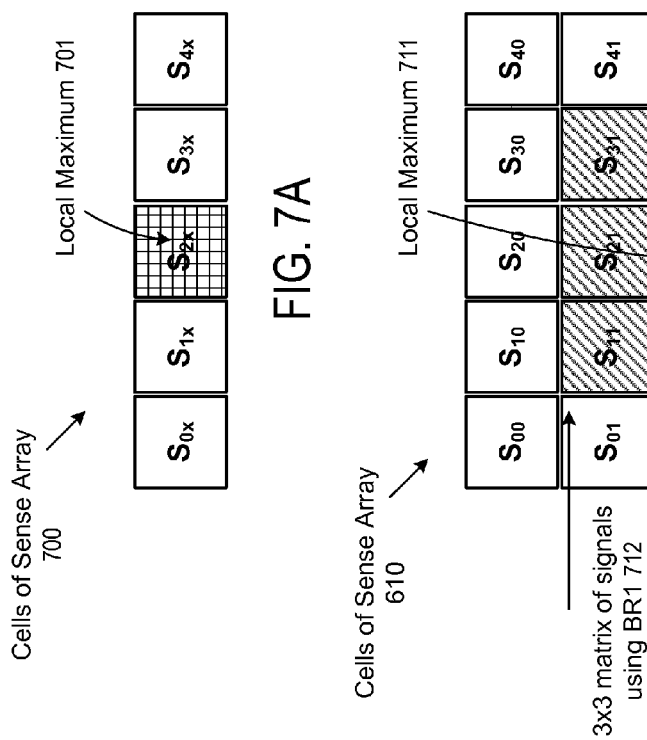

FIG. 8

METHOD AND APPARATUS FOR CALCULATING COORDINATES WITH HIGH NOISE IMMUNITY IN TOUCH APPLICATIONS

RELATED APPLICATIONS

This application claims the benefit of U.S. Provisional Application No. 61/859,969, filed Jul. 30, 2013, the entire contents of which is hereby incorporated herein by reference in its entirety.

TECHNICAL FIELD

The present disclosure relates generally to sensing systems, and more particularly to capacitance-sensing systems configurable to determine touch locations of touches on the capacitive-sensing systems in high noise environments.

BACKGROUND

Capacitance sensing systems can sense electrical signals generated on electrodes that reflect changes in capacitance. Such changes in capacitance can indicate a touch event (i.e., the proximity of an object to particular electrodes). Capacitive sense elements may be used to replace mechanical buttons, knobs, and other similar mechanical user interface controls. The use of a capacitive sense element allows for the elimination of complicated mechanical switches and buttons, providing reliable operation under harsh conditions. In addition, capacitive sense elements are widely used in modern consumer applications, providing interesting user interface options in existing products. Capacitive sense elements can range from a single button to a large number arranged in the form of a capacitive sense array for a touch-sensing surface.

Transparent touch screens that utilize capacitive sense arrays are ubiquitous in today's industrial and consumer markets. They can be found on cellular phones, GPS devices, set-top boxes, cameras, computer screens, MP3 players, digital tablets, and the like. The capacitive sense arrays work by measuring the capacitance of a capacitive sense element, and looking for a delta in capacitance indicating a touch or presence of a conductive object. When a conductive object (e.g., a finger, hand, or other object) comes into contact or close proximity with a capacitive sense element, the capacitance changes and the conductive object is detected. The capacitance changes of the capacitive touch sense elements can be measured by an electrical circuit. The electrical circuit converts the measured capacitances of the capacitive sense elements into digital values.

There are two typical types of capacitance: 1) mutual capacitance where the capacitance-sensing circuit has access to both electrodes of the capacitor; 2) self-capacitance where the capacitance-sensing circuit has only access to one electrode of the capacitor where the second electrode is tied to a DC voltage level or is parasitically coupled to Earth Ground. A touch panel has a distributed load of capacitance of both types (1) and (2) and Cypress' touch solutions sense both capacitances either uniquely or in hybrid form with its various sense modes.

BRIEF DESCRIPTION OF THE DRAWINGS

The present invention is illustrated by way of example, and not of limitation, in the figures of the accompanying drawings.

FIG. 7A illustrates cells of a one-dimensional sense array, according to one embodiment.

FIG. 7B illustrates cells of a two-dimensional sense array, according to one embodiment.

FIG. 7C illustrates cells of a two-dimensional sense array, according to another embodiment.

FIG. 8 illustrates cells of a two-dimensional sense array, according to another embodiment

DETAILED DESCRIPTION

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

Figure 1:
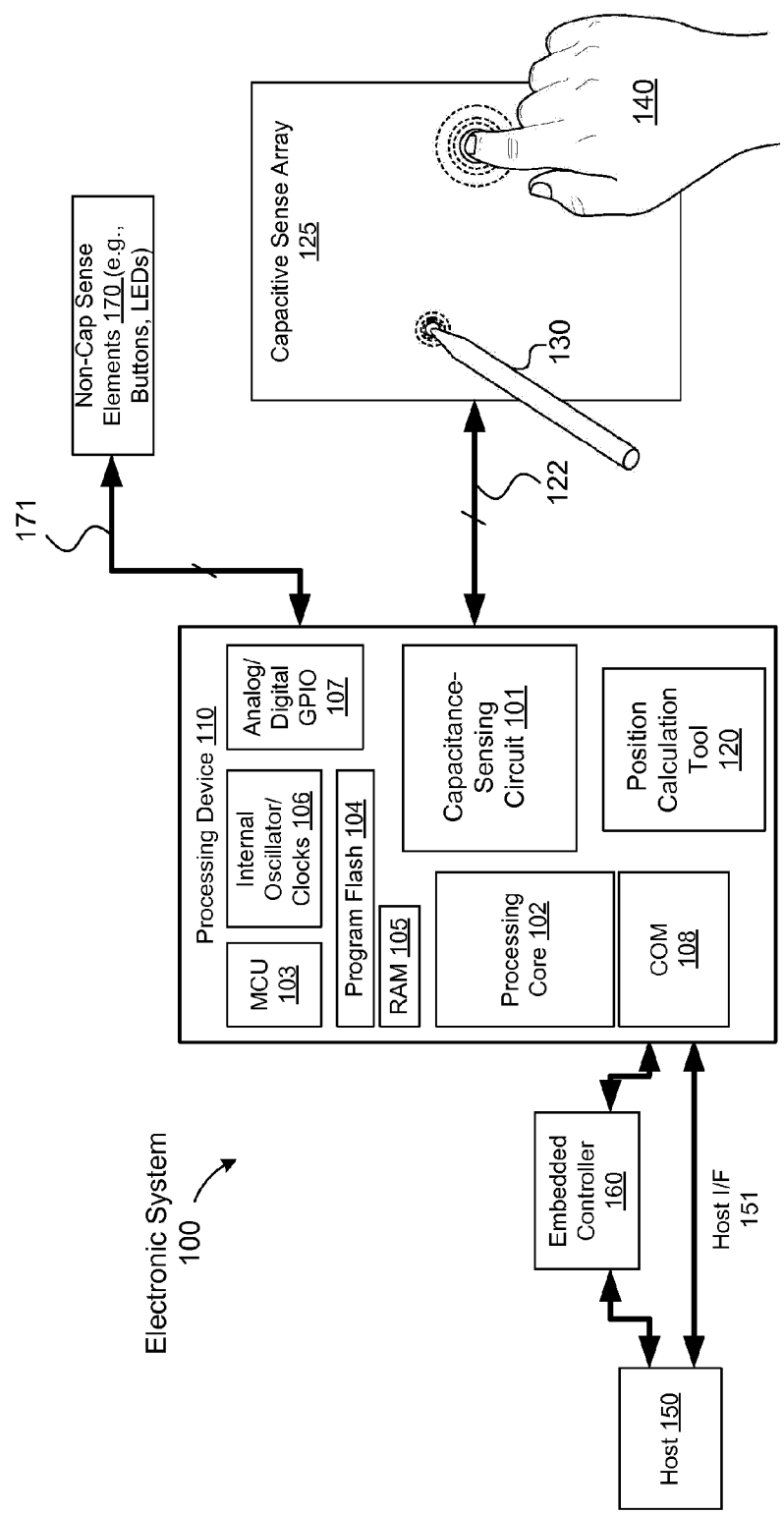
FIG. 1 is a block diagram illustrating one embodiment of an electronic system having a processing device, including a position calculation tool.

FIG. 1 is a block diagram illustrating one embodiment of an electronic system 100 having a processing device 110, including a position calculation tool 120. Details regarding the position calculation tool 120 are described in more detail with respect to FIGS. 2-4. In one embodiment, the processing device 110 includes the capacitance-sensing circuit 101 to measure capacitance on one or more sense elements of the capacitive-sense array 125 coupled to the processing device 110. For example, the capacitance-sensing circuit 101 measures a mutual capacitance of an intersection between a transmit (TX) electrode and a receive (RX) electrode of the capacitive-sense array 125. The capacitive-sense array 125 may be various types of touch-sensing devices.

In a further embodiment, the capacitance-sensing circuit 101 includes a TX signal generator to generate a TX signal to be applied to the TX electrode and a receiver (also referred to as a sensing channel), such as an integrator, to measure an RX signal on the RX electrode. In a further embodiment, the capacitance-sensing circuit 101 includes an analog-to-digital converter (ADC) coupled to an output of the receiver to convert the measured RX signal to a digital value (capacitance values). The digital value can be further processed by the processing device 110, the host 150, or both.

The processing device 110 is configured to detect one or more touches on a touch-sensing device, such as the capacitive sense array 125. The processing device can detect conductive objects, such as touch objects 140 (fingers, hovers or passive styluses, an active stylus 130, or any combination thereof). The capacitance-sensing circuit 101 can measure touch data on the capacitive sense array 125. The touch data may be represented as a single or multiple cells, each cell representing an isolated sense element or an intersection of sense elements (e.g., electrodes) of the capacitive sense array 125. In another embodiment, the touch data measured by the capacitance-sensing circuit 101 can be processed by the processing device 110 to generate a 2D capacitive image of the capacitive-sense array 125. In one embodiment, when the capacitance-sensing circuit 101 measures mutual capacitance of the touch-sensing device (e.g., capacitive-sense array 125), the capacitance-sensing circuit 101 determines a 2D capacitive image of the touch-sensing object on the touch surface and processes the data for peaks and positional information. In another embodiment, the processing device 110 is a microcontroller that measures a capacitance touch signal data set, and finger detection firmware executing on the microcontroller identifies data set areas that indicate touches, detects and processes peaks, calculates the coordinates, or any combination therefore. The firmware identifies the positional coordinates using the embodiments described herein. In one embodiment, the firmware can calculate precise coordinates for the resulting touch data. In one embodiment, the firmware can calculate the precise coordinates using a Blais Rioux algorithm. Alternatively, other coordinate position calculation algorithms may be selected to determine the touch position coordinates, such as Gradients, Centre of Mass (CoM) (a.k.a., Centroid), Linear Interpolation, Gaussian Approximation, and Parabolic Estimator. The microcontroller can report the precise coordinates to a host processor, as well as other information.

In one embodiment, capacitive sense array 125 may include multiple rows of electrodes and multiple columns of electrodes. In one embodiment, the row and column electrodes of capacitive sense array 125 may be connected to processing device 110. In one embodiment, the sensor electrodes of capacitive sense array 125 may be created with different patterns and shapes. In one embodiment, each intersection between a row electrode and a column electrode defines a unit cell (i.e., cell). Said differently, a unit cell corresponds to a pair of sensor electrodes including a row sensor electrode and column sensor electrode. The unit cell identifies an area of the capacitive sense array 125 where the mutual capacitance between the pair of electrodes may be affected by a finger or other conductive object proximate to the surface of the capacitive sensor array 125.

In one embodiment, the position calculation tool 120 may receive raw capacitance value from each cell of the capacitive sense array 125. In one embodiment, the capacitive-sensing circuit 101 receives the raw capacitance value from each cell and computes a difference count, which is a difference between the raw capacitance value and a baseline capacitance value. In another embodiment, the capacitance-sensing circuit 101 outputs the difference count based on the capacitance value of each cell to the position calculation tool 120. In one embodiment, the position calculation tool 120 performs analysis on the measurements received by the capacitive-sensing circuit 101 and determines a position calculation algorithm from multiple different position calculation algorithms to perform on the measurements. In another embodiment, the position calculation tool 120 receives an indication that high noise (e.g., noise from a charger) is present on capacitive sense array 125 and determines a position calculation algorithm based on the noise. In another embodiment, the position calculation tool 120 receives an indication of a touch on capacitive sense array 125 and determines a position calculation algorithm based on the touched region.

In one embodiment, the position calculation tool 120 is implemented in firmware of the processing device 110. In another embodiment, the position calculation tool 120 is implemented in software, hardware, or any combination thereof. In another embodiment, the position calculation tool 120 is implemented as part of a gesture recognition tool that calculates and reports gestures. In another embodiment, position of a touch is calculated by the position calculation tool 120 and sent as raw data to the host processor 150. In another embodiment, the position calculation tool 120 can be implemented on the host processor 150, and the capacitive-sensing circuit 101 obtains the touch data and sends the touch data to the position calculation tool 120 on the host processor 150. Alternatively, other configurations are possible as would be appreciated by one of ordinary skill in the art having the benefit of this disclosure. It should also be noted that the position coordinates may be used for gesture recognition in various applications.

The embodiments described herein regarding position calculation can be used to detect two or more touches at minimal finger separation on any sensor array pattern. The embodiments described herein take advantage of the ability to select a position calculation algorithm from multiple different position calculation algorithms to determine a more precise positional location. The embodiments described herein can be used for touchscreens, touchpads, or other devices having sensing surfaces. Additional details of the computations by the position calculation tool 120 are described below with respect to FIGS. 2-9.

Electronic system 100 includes processing device 110, capacitive sense array 125, stylus 130, host processor 150, embedded controller 160, and non-capacitive sense elements 170. The capacitive sense elements are electrodes of conductive material, such as copper, silver, indium tin oxide (ITO), metal mesh, carbon nanotubes, or the like. The sense elements may also be part of an indium tin oxide (ITO) panel. The capacitive sense elements can be used to allow the capacitive-sensing circuit 101 to measure self-capacitance, mutual capacitance, or any combination thereof. In the depicted embodiment, the electronic system 100 includes the capacitive sense array 125 coupled to the processing device 110 via bus 122. The capacitive sense array 125 may include a multi-dimension capacitive sense array. The multi-dimension sense array includes multiple sense elements, organized as rows and columns. In another embodiment, the capacitive sense array 125 operates as an all-points-addressable ("APA") mutual capacitive sense array. In another embodiment, the capacitive sense array 125 is non-transparent capacitive sense array (e.g., PC touchpad). The capacitive sense array 125 may be disposed to have a flat surface profile. Alternatively, the capacitive sense array 125 may have non-flat surface profiles. Alternatively, other configurations of capacitive sense arrays may be used. For example, instead of vertical columns and horizontal rows, the capacitive sense array 125 may have a hexagon arrangement, or the like, as would be appreciated by one of ordinary skill in the art having the benefit of this disclosure. In one embodiment, the capacitive sense array 125 may be included in an ITO panel or a touch screen panel.

The operations and configurations of the processing device 110 and the capacitive sense array 125 for detecting and tracking the touch object 140 and stylus 130 are described herein. In short, the processing device 110 is configurable to detect a presence of the touch object 140, a presence of a stylus 130 on the capacitive sense array 125, or any combination thereof. The processing device 110 may detect and track the stylus 130 and the touch object 140 individually on the capacitive sense array 125. In one embodiment, the processing device 110 can detect and track both the stylus 130 and touch object 140 concurrently on the capacitive sense array 125. If the touching object is an active stylus, in one embodiment, the active stylus 130 is configurable to operate as the timing "master," and the processing device 110 adjusts the timing of the capacitive sense array 125 to match that of the active stylus 130 when the active stylus 130 is in use. In one embodiment, the capacitive sense array 125 capacitively couples with the active stylus 130, as opposed to conventional inductive stylus applications. It should also be noted that the same assembly used for the capacitive sense array 125, which is configurable to detect touch objects 140, is also used to detect and track a stylus 130 without an additional PCB layer for inductively tracking the active stylus 130.

In the depicted embodiment, the processing device 110 includes analog and/or digital general purpose input/output ("GPIO") ports 107. GPIO ports 107 may be programmable. GPIO ports 107 may be coupled to a Programmable Interconnect and Logic ("PIL"), which acts as an interconnect between GPIO ports 107 and a digital block array of the processing device 110 (not shown). The digital block array may be configurable to implement a variety of digital logic circuits (e.g., DACs, digital filters, or digital control systems) using, in one embodiment, configurable user modules ("UMs"). The digital block array may be coupled to a system bus. Processing device 110 may also include memory, such as random access memory ("RAM") 105 and program flash 104. RAM 105 may be static RAM ("SRAM"), and program flash 104 may be a non-volatile storage, which may be used to store firmware (e.g., control algorithms executable by processing core 102 to implement operations described herein). Processing device 110 may also include a memory controller unit ("MCU") 103 coupled to memory and the processing core 102. The processing core 102 is a processing element configured to execute instructions or perform operations. The processing device 110 may include other processing elements as would be appreciated by one of ordinary skill in the art having the benefit of this disclosure. It should also be noted that the memory may be internal to the processing device or external to it. In the case of the memory being internal, the memory may be coupled to a processing element, such as the processing core 102. In the case of the memory being external to the processing device, the processing device is coupled to the other device in which the memory resides as would be appreciated by one of ordinary skill in the art having the benefit of this disclosure.

The processing device 110 may also include an analog block array (not shown, e.g., field programmable analog array). The analog block array is also coupled to the system bus. Analog block array may also be configurable to implement a variety of analog circuits (e.g., ADCs or analog filters) using, in one embodiment, configurable UMs. The analog block array may also be coupled to the GPIO ports 107.

As illustrated, capacitance-sensing circuit 101 may be integrated into processing device 110. Capacitance-sensing circuit 101 may include analog I/Os for coupling to an external component, such as a touch-sensor pad (not shown), capacitive sense array 125, touch-sensor slider (not shown), touch-sensor buttons (not shown), and/or other devices. The capacitance-sensing circuit 101 may be configurable to measure capacitance using mutual capacitance sensing techniques, self-capacitance sensing technique, charge coupling techniques, or the like. In one embodiment, capacitance-sensing circuit 101 operates using a charge accumulation circuit, a capacitance modulation circuit, or other capacitance sensing methods known by those skilled in the art. In an embodiment, the capacitance-sensing circuit 101 is of the Cypress TMA-3xx, TMA-4xx, or TMA-xx families of touch screen controllers. Alternatively, other capacitance-sensing circuits may be used. The mutual capacitive sense arrays, or touch screens, as described herein, may include a transparent, conductive sense array disposed on, in, or under either a visual display itself (e.g. LCD monitor), or a transparent substrate in front of the display. In an embodiment, the TX and RX electrodes are configured in rows and columns, respectively. It should be noted that the rows and columns of electrodes can be configured as TX or RX electrodes by the capacitance-sensing circuit 101 in any chosen combination. In one embodiment, the TX and RX electrodes of the capacitive sense array 125 are configurable to operate as a TX and RX electrodes of a mutual capacitive sense array in a first mode to detect touch objects, and to operate as electrodes of a coupled-charge receiver in a second mode to detect a stylus on the same electrodes of the sense array. The stylus, which generates a stylus TX signal when activated, is used to couple charge to the capacitive sense array, instead of measuring a mutual capacitance at an intersection of a RX electrode and a TX electrode (a sense element) as done during mutual capacitance sensing. An intersection between two sense elements may be understood as a location at which one sense electrode crosses over or overlaps another, while maintaining galvanic isolation from each other. The capacitance associated with the intersection between a TX electrode and an RX electrode can be sensed by selecting every available combination of TX electrode and RX electrode. When a touch object, such as a finger or stylus, approaches the capacitive sense array 125, the object causes a decrease in mutual capacitance between some of the TX/RX electrodes. In another embodiment, the presence of a finger increases the capacitance of the electrodes to the environment (Earth) ground, typically referred to as self-capacitance change. Utilizing the change in mutual capacitance, the location of the finger on the capacitive sense array 125 can be determined by identifying the RX electrode having a decreased coupling capacitance between the RX electrode and the TX electrode to which the TX signal was applied at the time the decreased capacitance was measured on the RX electrode. Therefore, by sequentially determining the capacitances associated with the intersection of electrodes, the locations of one or more touch objects can be determined. It should be noted that the process can calibrate the sense elements (intersections of RX and TX electrodes) by determining baselines for the sense elements. It should also be noted that interpolation may be used to detect finger position at better resolutions than the row/column pitch as would be appreciated by one of ordinary skill in the art having the benefit of this disclosure. In addition, various types of coordinate interpolation algorithms (e.g., position calculation algorithms) may be used to detect the center of the touch as would be appreciated by one of ordinary skill in the art having the benefit of this disclosure.

In an embodiment, the electronic system 100 may also include non-capacitive sense elements 170 coupled to the processing device 110 via bus 171 and GPIO port 107. The non-capacitive sense elements 170 may include buttons, light emitting diodes ("LEDs"), and other user interface devices, such as a mouse, a keyboard, or other functional keys that do not use capacitance sensing. In one embodiment, buses 122, and 171 are embodied in a single bus. Alternatively, these buses may be configured into any combination of one or more separate buses.

Processing device 110 may include internal oscillator/clocks 106 and communication block ("COM") 108. In another embodiment, the processing device 110 includes a spread-spectrum clock (not shown). The oscillator/clocks 106 provide clock signals to one or more of the components of processing device 110. Communication block 108 may be used to communicate with an external component, such as a host processor 150, via host interface ("I/F") line 151. Alternatively, processing device 110 may also be coupled to embedded controller 160 to communicate with the external components, such as host processor 150. In one embodiment, the processing device 110 is configurable to communicate with the embedded controller 160 or the host processor 150 to send and/or receive data.

Processing device 110 may reside on a common carrier substrate such as, for example, an integrated circuit ("IC") die substrate, a multi-chip module substrate, or the like. Alternatively, the components of processing device 110 may be one or more separate integrated circuits and/or discrete components. In one exemplary embodiment, processing device 110 is the Programmable System on a Chip (PSoC®) processing device, developed by Cypress Semiconductor Corporation, San Jose, Calif. Alternatively, processing device 110 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to a host (e.g., host 150), but may include a system that measures the capacitance on the sensing device and sends the raw data to a host computer where it is analyzed by an application. In effect, the processing that is done by processing device 110 may also be done in the host (e.g., host 150).

Capacitance-sensing circuit 101 may be integrated into the IC of the processing device 110, or alternatively, in a separate IC. Alternatively, descriptions of capacitance-sensing circuit 101 may be generated and compiled for incorporation into other integrated circuits. For example, behavioral level code describing the capacitance-sensing circuit 101, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout may represent various levels of abstraction to describe capacitance-sensing circuit 101.

It should be noted that the components of electronic system 100 may include all the components described above. Alternatively, electronic system 100 may include some of the components described above.

In one embodiment, the electronic system 100 is used in a tablet computer. Alternatively, the electronic device may be used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, an eBook reader, global position system ("GPS"), or a control panel. The embodiments described herein are not limited to touch screens or touch-sensor pads for notebook implementations, but can be used in other capacitive sensing implementations, for example, the sensing device may be a touch-sensor slider (not shown) or touch-sensor buttons (e.g., capacitance sensing buttons). In one embodiment, these sensing devices include one or more capacitive sensors or other types of capacitance-sensing circuitry. The operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc.) handwriting recognition, and numeric keypad operation.

Standard algorithms to calculate reported positions of the conductive object on a touch panel have good accuracy with low noise levels but are quite sensitive to the influence of high noise.

Figure 2:
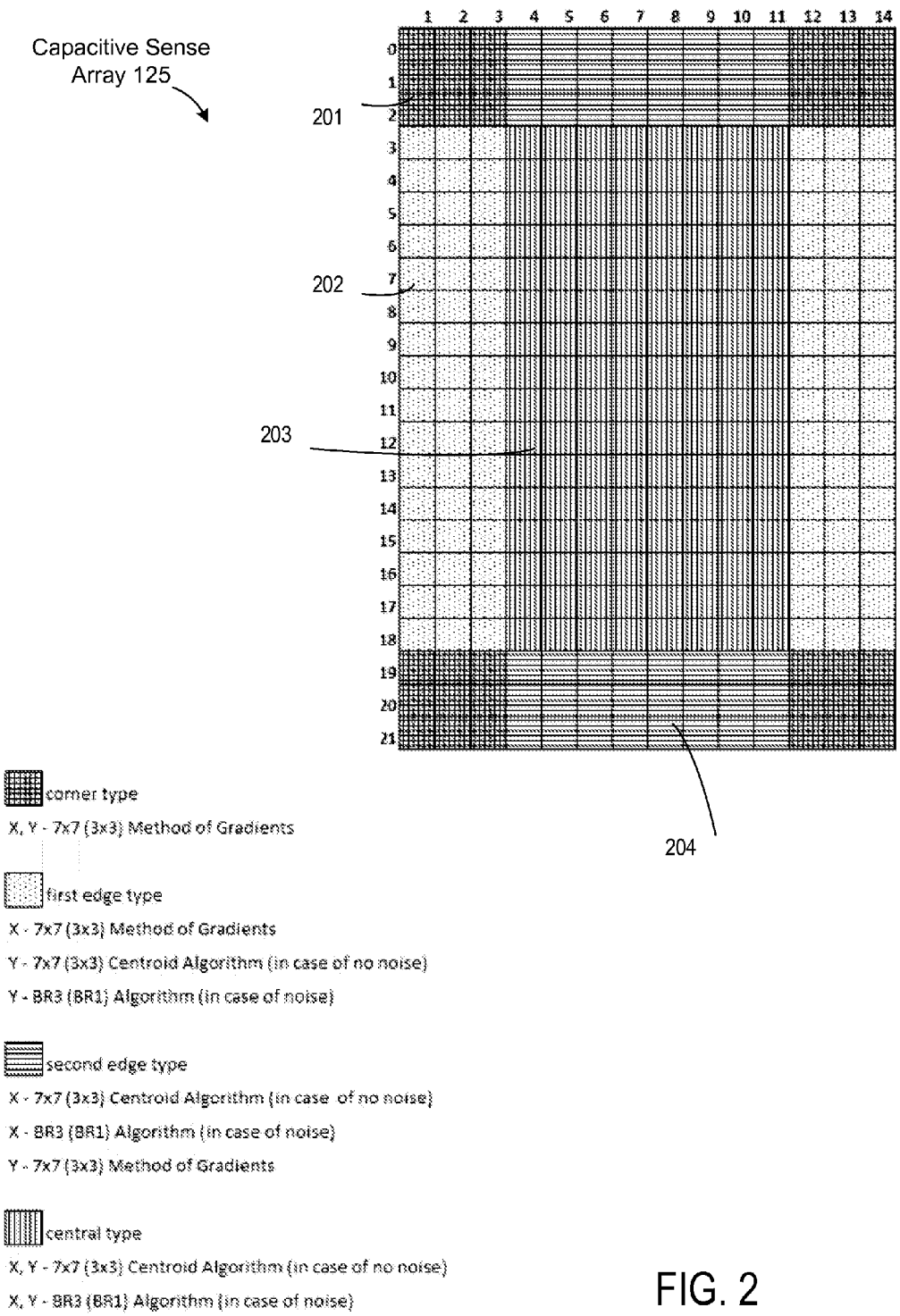
FIG. 2 illustrates multiple region types of a sense array, according to one embodiment.

FIG. 2 illustrates multiple region types of a sense array, according to one embodiment. In FIG. 2, regions of the capacitive sense array 125 include multiple region types. In one embodiment, the regions of capacitive sense array 125 correspond to cells. In another embodiment, the regions of capacitive sense array 125 correspond to electrodes.

In FIG. 2, multiple regions of the capacitive sense array 125 correspond to multiple region types. In one embodiment, capacitive sense array 125 includes four distinct region types: corner type 201, first edge type 202, second edge type 204, and central type 203. In one embodiment, the corner type 201 may correspond to the four corner regions of capacitive sense array 125. In one embodiment, the first edge type 202 may correspond to the right and left edge region of capacitive sense array 125. In one embodiment, the second edge type 204 may correspond to the upper and lower edge region of capacitive sense array 125. In one embodiment, the central type may correspond to the center or core region of the capacitive sense array 125. In another embodiment, capacitive sense array 125 may have greater or fewer regions than represented in FIG. 2. In another embodiment, the regions may be defined as areas different than those depicted in FIG. 2.

Identifying from the touch data a touched region of capacitive sense array 125 may be performed by processing logic that may include hardware (circuitry, dedicated logic, etc.), software (such as is run on a general purpose computing system or a dedicated machine), firmware (embedded software), or any combination thereof. In one embodiment, the processing device 110 identifies a touched region. In another embodiment, the position calculation tool 120 identifies a touched region. Alternatively, other components of the electronic system 100 perform some or all of the operations in identifying a touched region.

In one embodiment, processing logic is configured to detect one or more touches on capacitive sense array 125. The one or more touches on capacitive sense array 125 produces touch data. In one embodiment, processing logic obtains the touch data and identifies the region (e.g., corner type 201, first edge type 202, second edge type 204, or central type 203) on the capacitive sense array 125 where the touch occurred. Processing logic may select a position calculation algorithm based on the region where the touch occurred. A selected position calculation algorithm is selected from multiple different position calculation algorithms based on the identified touched region where the touch occurred.

Figure 3:
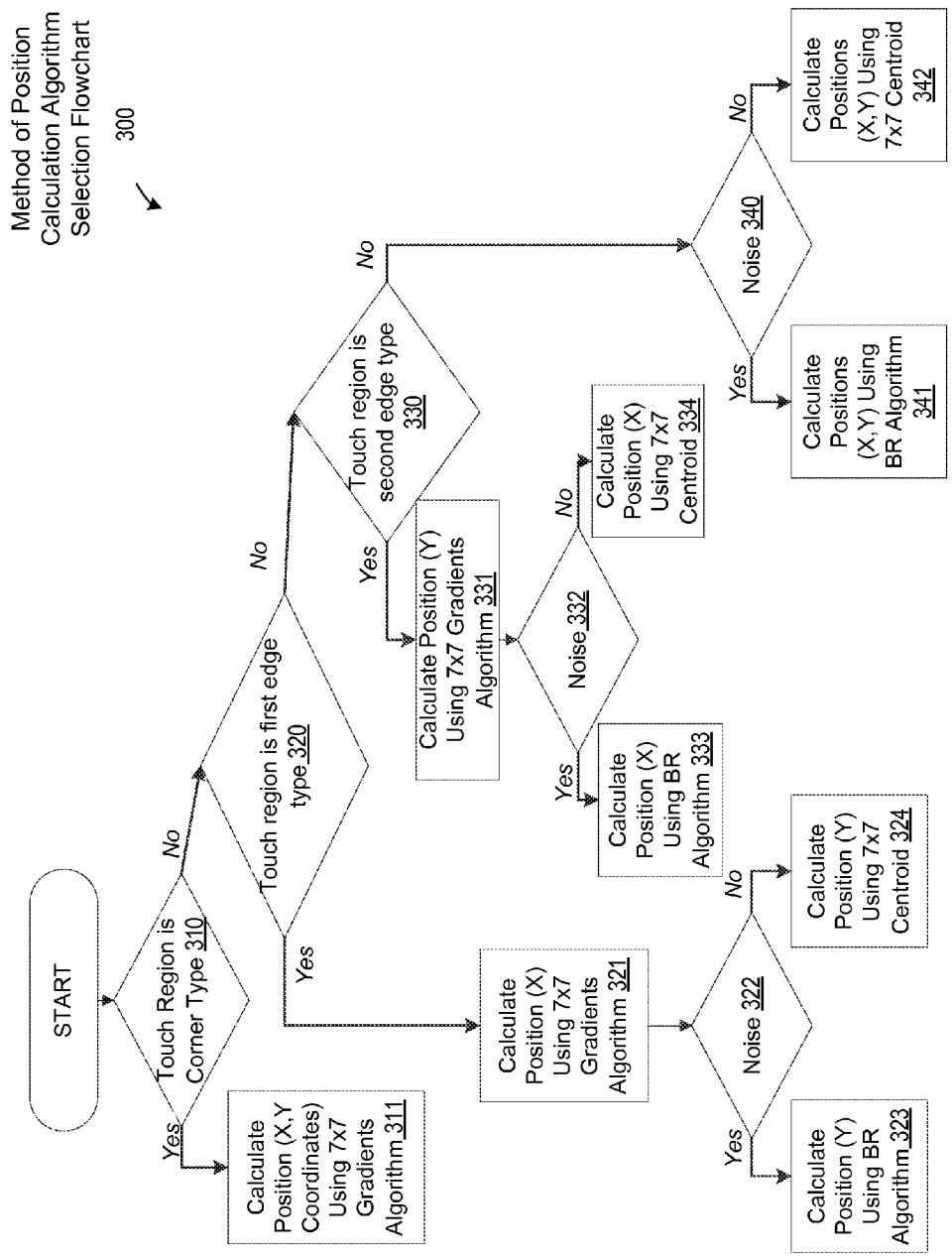
FIG. 3 is flowchart of a method illustrating position calculation algorithm selection, in one embodiment.

FIG. 3 is flowchart of a method illustrating position calculation algorithm selection, in one embodiment. The method 300 may be performed by processing logic that may include hardware (circuitry, dedicated logic, etc.), software (such as is run on a general purpose computing system or a dedicated machine), firmware (embedded software), or any combination thereof. In one embodiment, the processing device 110 performs some or all of method 300. In another embodiment, the position calculation tool 120 performs some or all of the operations of method 300. Alternatively, other components of the electronic system 100 perform some or all of the operations of method 300.

In FIG. 3, method 300 begins when a touch region is determined by processing logic. In one embodiment, processing logic obtains touch data from capacitive sense array 125 and identifies the region of the touch (e.g., corner type 201, first edge type 202, second edge type 204, or central type 203). In another embodiment, processing logic may determine the position of a touch on capacitive sense array 125 after receiving measured touch data from capacitive-sensing circuit 101. Processing logic selects a position calculation algorithm from multiple different position algorithms based on the touched region or sensed noise on capacitive sense array 125. The multiple different position calculation algorithms include at least Gradients, Blais Rioux (BR), Centre of Mass (CoM) (a.k.a., Centroid), Linear Interpolation, Gaussian Approximation, and Parabolic Estimator.

In method 300, processing logic determines the region of the touch at capacitive sense array 125 at block 310, block 320, and block 330 in order to determine the position calculation algorithm to be used. It should be noted that if the touch region is a central type 203, the flowchart passes through block 310, block 320, and block 330 to block 340.

In block 310, if processing logic determines the touch is a corner type 201, the processing logic moves to block 311 and calculates position of the X- and Y-coordinates using a Gradients algorithm. In one embodiment, the processing logic selects the Gradients algorithm for a 7×7 matrix of cells. Cells represent an intersection of sense elements (e.g., electrodes) of the capacitive sense array 125. In another embodiment, processing logic may select a different Gradients algorithm to be performed on matrix of cells of a different size, for example a 5×5 matrix of cells corresponding to capacitive sense array 125. If the processing logic determines that the touch is not a corner type 201, processing logic moves to block 320. It should be noted that processing logic may move through block 310, block 320, block 330, and block 340 in any order, but for the ease of explanation, method 300 is described as moving successively through block 310, block 320, block 330, and block 340.

In block 320, if processing logic determines the touch is a first edge type 202, the processing logic performs block 321 and calculates position of a coordinate, for example the X-coordinate, using a Gradients algorithm. In one embodiment, the processing logic selects the Gradients algorithm for a 7×7 matrix of cells. In another embodiment, the processing logic may select a different Gradients algorithm to be performed on matrix of cells of a different size, for example a 5×5 matrix of cells corresponding to capacitive sense array 125.

After performing block 321, the processing logic subsequently moves to block 322 to determines if noise exists on the capacitive sense array 125. In one embodiment, noise may be produced from a charger, a source internal to a device, or another external source. In another embodiment, noise is injected onto the capacitive sense array 125 and is captured as an electric signal in the touch data. The touch data, which includes the noise, may be sent to the capacitive-sensing circuit 101 and measured. In one embodiment, noise may be detected by the processing logic, generally, or the processing device 110, specifically. In one embodiment, if a threshold of noise is met or exceeded then processing logic moves to block 323. For example, a noise threshold may be set as a signal-to-noise ratio of less than five. In one embodiment, the noise threshold may be predetermined and stored in RAM 105, updated periodically, or updated dynamically using, for example, the position calculation tool 120. If noise is detected, processing logic selects block 323 and calculates a position coordinate, for example the Y-coordinate, using a BR algorithm. The processing logic may select a BR algorithm for a matrix of cells of various sizes. For example, the processing logic may select a BR algorithm for at least a 3×3 matrix of cells, a 5×5 matrix of cells, a 7×7, or larger matrix of cells. If noise is not detected, processing logic selects block 324 and calculates a position coordinate, for example, the Y-coordinate, using a Centroid algorithm. The processing logic may select a Centroid algorithm for a matrix of cells of various sizes.

In a touch sensor system, for example electronic system 100, external sources of noise (e.g., from batter chargers) cause noise currents to be coupled from a user's finger to the capacitive sense array 125. The noise current may corrupt measurements made by the electronic system 100 and can result in large errors in the computed touch positions, false touches, and suppression of the signal produced by actual touches so that actual touches are not reported. Noise may be measured using metric scans (e.g. wide band noise peak, noise frequency, etc.). The metric scans may be performed sequentially with touch sensing scans, where the touch sensing scans are to measure the position of a touch proximate capacitive sense array 125. The metric scans on the touch data may generate noise metrics that identify parameters of the noise (e.g., frequency, magnitude, etc.)

In one embodiment, the different position calculation algorithms have different noise immunity in the Rx and Tx directions. In the case of the Rx direction, common mode noise (CMN) may exist. Common mode noise may be injected electronic system 100 by external sources of noise, such as an LCD panel or charger. In the Rx direction, all signals may be obtained simultaneously by, for example, processing device 110. Consequently, the received noise may be large and the noise metric produced also large. In one implementation, the BR methods, in for example FIGS. 3, 4, and 6, may be used to suppress noise in the Rx direction. In the Tx direction, noise may be Gaussian noise, which does not have the same characteristics as common mode noise. In one embodiment, in the Tx direction signals may be transmitted at different moments in time. In such a case, multiple noise metrics may be obtained by processing logic. In one embodiment, the selection of a position calculation algorithm may be based on any of the obtained noise metrics. In another embodiment, the selection of the position calculation algorithm may be based on the noise metric that is the largest.

In block 330, if processing logic determines a touch is a second edge type 204, the processing logic performs block 331 and calculates position of a coordinate, for example the Y-coordinate, using a Gradients algorithm. In one embodiment, the processing logic selects the Gradients algorithm for a 7×7 matrix of cells. In another embodiment, the processing logic may select a different Gradients algorithm to be performed on matrix of cells of a different size, for example, a 3×3 matrix of cells corresponding to capacitive sense array 125.

After performing block 331, the processing logic subsequently moves to block 332 to determine if noise exists on the capacitive sense array 125. In one embodiment, noise may be produced from a charger, a source internal to a device, or another external source. In another embodiment, noise is injected onto the capacitive sense array 125 and is captured as an electric signal in the touch data. If noise is detected, processing logic selects block 333 and calculates a position coordinate, for example the X-coordinate, using a BR algorithm. The processing logic may select a BR algorithm for a matrix of cells of various sizes. For example, the processing logic may select a BR algorithm for at least a 3×3 matrix of cells, a 5×5 matrix of cells, or a 7×7, or larger matrix of cells. If noise is not detected, processing logic selects block 334 and calculates a position coordinate, for example the X-coordinate, using a Centroid algorithm. The processing logic may select a Centroid algorithm for a matrix of cells of various sizes.

In block 340, processing logic determines, in one embodiment, that a touch is a central type 203. In block 340, processing logic determines if noise exists on the capacitive sense array 125. If noise is detected, processing logic selects block 341 and calculates position coordinates, for example, the X- and Y-coordinates using a BR algorithm. The processing logic may select a BR algorithm for a matrix of cells of various sizes. For example, the processing logic may select a BR algorithm for at least a 3×3 matrix of cells, a 5×5 matrix of cells, or a 7×7, or larger matrix of cells. If noise is not detected, processing logic selects block 342 and calculates position coordinates, for example, the X- and Y-coordinates using a Centroid algorithm. The processing logic may select a Centroid algorithm for a matrix of cells of various sizes.

In FIG. 3, method 300 shows the decision process to determine the selection of different position calculation algorithms based on region type of a touch and noise sensed on capacitive sense array 125. In another embodiment, the selection of different position calculation algorithms may be based on other or additional criteria. For example, the decision process to determine the selection of different position calculation algorithms can be made based on the type of touch object (e.g., regular sized finger, fat finger, hover, passive or active styluses, gloves, etc.), the level of noise, distance between two or more touches, etc.

Figure 4:
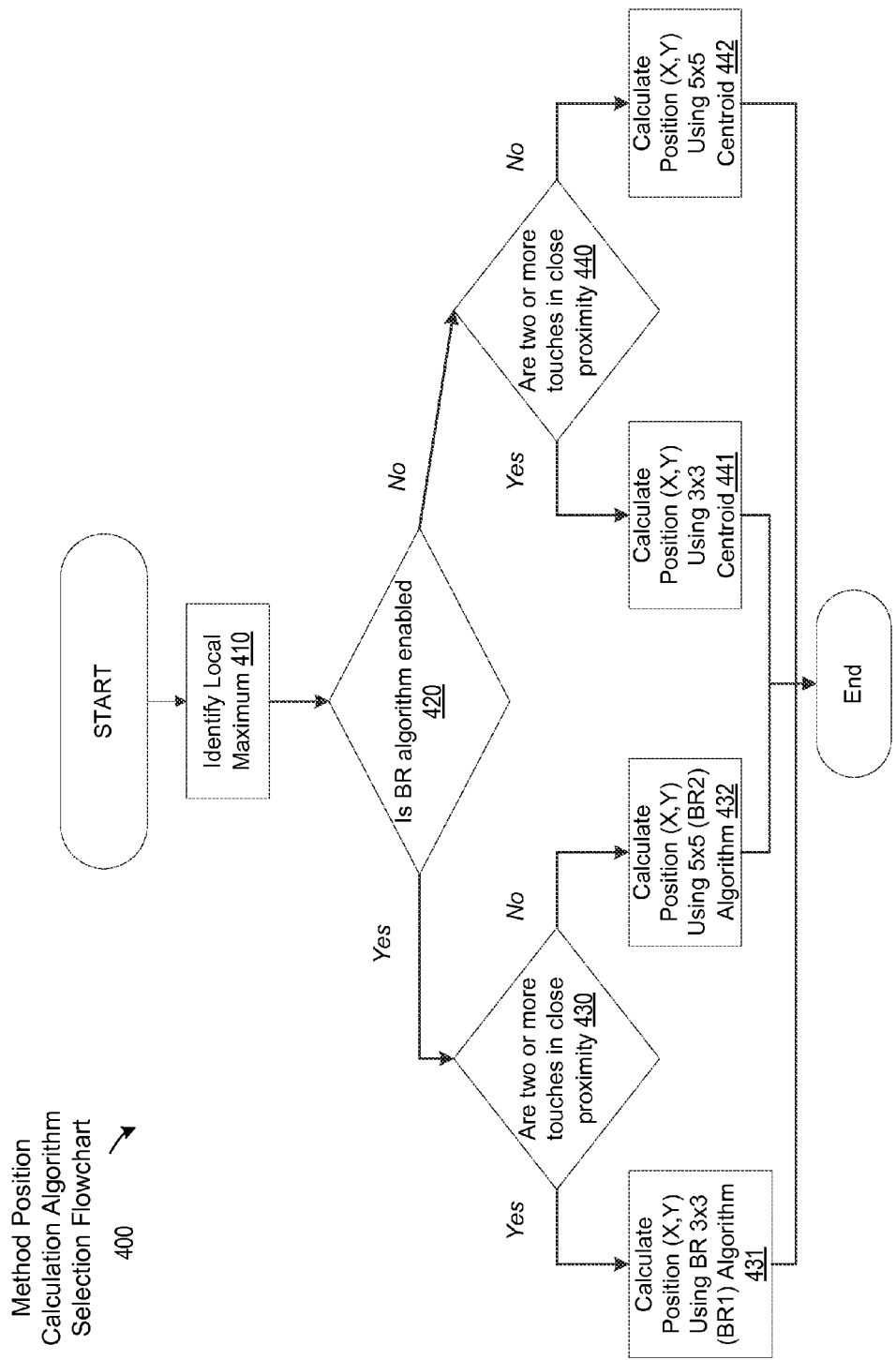
FIG. 4 is flowchart of a method illustrating position calculation algorithm selection, in another embodiment.

FIG. 4 is flowchart of a method illustrating position calculation algorithm selection, in another embodiment. The method 400 may be performed by processing logic that may include hardware (circuitry, dedicated logic, etc.), software (such as is run on a general purpose computing system or a dedicated machine), firmware (embedded software), or any combination thereof. In one embodiment, the processing device 110 performs some or all the operations of method 400. In another embodiment, the position calculation tool 120 performs some or all the operations of method 400. Alternatively, other components of the electronic system 100 perform some or all of the operations of method 400.

In FIG. 4 in one embodiment, processing logic measures touch data from the capacitive sense array 125 and determines the region of the touch. Processing logic selects a position calculation algorithm from multiple different position algorithms. The multiple different position calculation algorithms include at least Gradients, Blais Rioux (BR), Centre of Mass (CoM) (a.k.a., Centroid), Linear Interpolation, Gaussian Approximation, and Parabolic Estimator.

In one embodiment, FIG. 4 demonstrates the decision making process that processing logic uses to select a position calculation algorithm from multiple position calculation algorithms based on the proximity of two touches, for example, a touch executed by two fingers. Touch data consisting of two touches presents an issue with position detection because two touches may erroneously be construed as a single touch. In one embodiment of method 400, processing logic measures a first set of touch data on capacitive sense array 125. The processing logic determines that the touch data represents two or more touches proximate to the capacitive sense array 125. In method 400 processing logic determines a position calculation algorithm from multiple position calculation algorithms to determine the position based on the two or more touches proximate the capacitive sense array 125.

Method 400 starts at block 410 where the processing logic determines a local maximum. In one embodiment, a touch produces touch data on capacitive sense array 125. The touch data is measured by capacitance-sensing circuit 101. In another embodiment, touch data is measured by processing logic. The touch data may be represented as multiple cells, each cell representing an intersection of sense elements of capacitive sense array 125. The touch data can be represented as counts, wherein the cell most proximate the touch produces the highest count. A local maximum, for example, local maximum 701 of FIG. 7A, represents the cell with the highest count. Two or more touches detected proximate to the capacitive sense array 125 may produce multiple local maximums, each local maximum producing the largest count (i.e., maximum touch data) relative to the cells adjacent each of the local maximums.

After identifying the local maximum in block 401 of method 400 processing logic proceeds to block 420. In block 420 processing logic determines if the BR algorithm is enabled. In one embodiment, a flag is stored in processing logic indicating that the BR algorithm is to be used for all position calculations. In another embodiment, a flag is stored in processing logic indicating that the BR algorithm is to be used for some position calculations. In one embodiment, processing logic determines if the flag enabling the BR algorithm is enabled.

In one embodiment, after determining that the BR algorithm is enabled in block 420 processing logic moves to block 430 and determines if a touch includes two or more touches in close proximity. If the processing logic determines a touch includes two or more touches in close proximity, processing logic moves to block 431. In block 431, the processing logic may select a BR algorithm for a 3×3 matrix (BR1) to calculate the position coordinates, for example the X- and Y-coordinates. If the processing logic determines that the touch does not include two or more touches in close proximity the processing logic moves to block 432. In block 432, the processing logic may select BR algorithm for a 5×5 matrix (BR2) to calculate the position coordinates, for example the X- and Y-coordinates. In another embodiment, the processing logic may select the BR algorithm for a larger matrix, for example a 7×7 or 9×9 matrix. It should be noted that selecting a smaller cell matrix on which to perform a BR position calculation provides for finer resolution to detect multiple touches in close proximity.

Returning to block 420 of FIG. 4, if BR flag is not enabled the processing logic moves to block 440, in one embodiment. In block 440, processing logic determines if a touch includes two or more touches in close proximity. If the touch includes two or more touches in close proximity, the processing logic moves to block 441. In block 441, the processing logic may select another position calculation algorithm from the multiple position calculation algorithms. Since the BR flag has not been enabled, a BR algorithm may not be selected. The processing logic may select a Centroid algorithm for a 3×3 matrix to calculate the position coordinates, for example, the X- and Y-coordinates. It should be noted that selecting a smaller cell matrix on which to perform a position calculation algorithm provides for finer resolution to detect multiple touches in close proximity.

Returning to block 420, if processing logic determines that the touch does not include two or more touches in close proximity, the processing logic moves to block 442. In one embodiment in block 442, the processing logic selects a Centroid algorithm for a 5×5 matrix to calculate the position coordinates, for example, the X- and Y-coordinates. In another embodiment, the processing logic may select a Centroid algorithm for a larger matrix, for example, a 7×7, 9×9, or larger matrix.

The embodiments described above are discussed in scenarios of two touches detected on the sense array, however, the embodiments may also be used in scenarios where there is one touch, as well as three or more touches. Also, the position calculation techniques may be used when the two or more touches are close together, such as when at least two touches overlap at least one sense element, as well as when the two or more touches are farther apart. Also, the embodiments described herein can be used when one or more touches are at the edge of the sensor array. For example, a partial touch may be detected at the edge of the sense array and the position calculation techniques described herein can be used to determine the touch geometry, including the touch size position for the partial touch.

Figure 5:
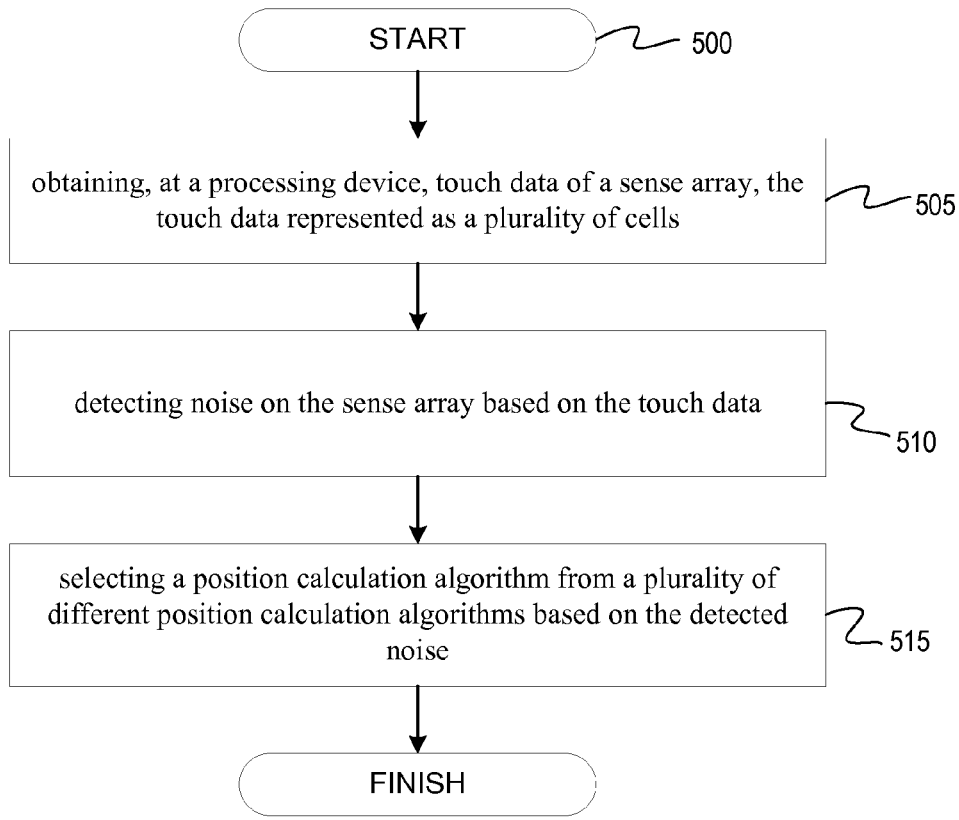
FIG. 5 is a flowchart of a method of detecting position, according to one embodiment.

FIG. 5 is a flowchart of a method of detecting position, according to one embodiment. The method 500 may be performed by processing logic that may include hardware (circuitry, dedicated logic, etc.), software (such as is run on a general purpose computing system or a dedicated machine), firmware (embedded software), or any combination thereof. In one embodiment, the processing device 110 performs some or all of the operations of method 500. In another embodiment, the position calculation tool 120 performs some or all of the operations of method 500. Alternatively, other components of the electronic system 100 perform some or all of the operations of method 500.

In FIG. 5, method 500 begins at block 505 wherein processing logic obtains touch data from a sense array, for example capacitive sense array 125, the touch data represented as multiple cells. In block 510, processing logic may detect noise on capacitive sense array 125 based on the touch data. Noise may be produced by a charger, a source internal to a device, or other external source. In another embodiment, noise is injected onto the capacitive sense array 125 and is captured as an electric signal in the touch data. The touch data, which includes the noise, may be sent to the processing logic and measured. In one embodiment, noise may be detected by the processing logic, generally, or the processing device 110, specifically. In one embodiment, if a threshold of noise is met or exceeded, then the processing logic determines an appropriate position calculation algorithm in response to the noise. In one embodiment, a noise threshold may be set as a signal-to-noise ratio of less than five. In one embodiment, the noise threshold may be predetermined and stored in RAM 105, updated periodically, or updated dynamically using processing logic. In block 515 of method 500, processing logic selects a position calculation algorithm from multiple different position calculation algorithms based on the detected noise. The multiple different position calculation algorithms include but are not limited to Gradients, Blais Rioux (BR), Centre of Mass (CoM) (a.k.a., Centroid), Linear Interpolation, Gaussian Approximation, and Parabolic Estimator.

Figure 6:
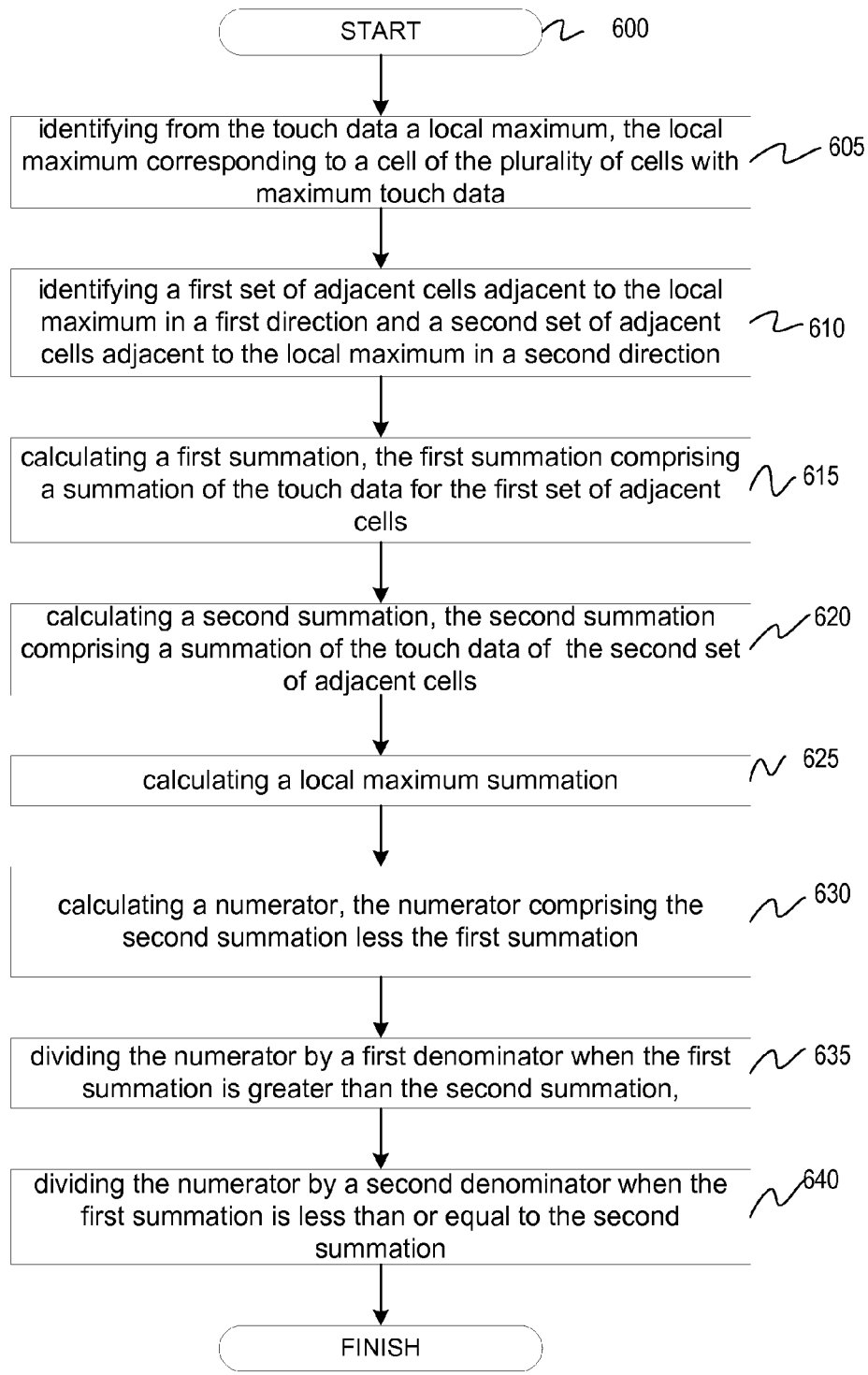
FIG. 6 illustrates a method of calculating a BR weight, according to one embodiment.

FIG. 6 illustrates a method of calculating a BR weight, according to one embodiment. Method 600 may be performed by processing logic that may include hardware (circuitry, dedicated logic, etc.), software (such as is run on a general purpose computing system or a dedicated machine), firmware (embedded software), or any combination thereof. In one embodiment, the processing device 110 performs some or all of the operations of method 600. In another embodiment, the position calculation tool 120 performs some or all of the operations of method 600. Alternatively, other components of the electronic system 100 perform some or all of the operations of method 600.

In FIG. 6 in one embodiment, the processing logic selects the BR algorithm for position calculation and performs the calculation of a BR weight. A BR weight is calculated in order to perform a position calculation using the BR algorithm. In one embodiment, a BR weight is based on the touch data of a touch detected proximate to the sense array. The BR weight may be used as a variable in a position calculation equation in order to determine, with more precision, the position of a touch. For example, the BR weight ($X_0$) may be used as a variable in the following equation to calculate position, $X_c$.

$$x_c = \text{Pitch} X \cdot (i + 0.5 + x_0) \qquad \text{Eq. 1}$$

In equation 1, "i" is the cell location of the local maximum and "PitchX" is the distance from a center of one cell to the center of another adjacent cell (typically measured in millimeters (mm)). In another embodiment, from the user's perspective, coordinates may be calculated in LCD resolution (points). As such, PitchX may be the number of points related to one cell. For example, if resolution is X=3700 points and there are $N_x$=37 electrodes, then PitchX=resolution X/$N_x$=100 points. "I" is the index of the cell of the local maximum. $X_c$ may represent the X-coordinate of a touch. The Y-coordinate may be calculated in a similar manner. A BR weight may be calculated for multiple axes, for example, the X-axis and Y-axis, in order to calculate position of a touch.

FIGS. 7A, 7B, and 7C may be used to help illustrate some of the concepts in method 600 presented in FIG. 6. FIG. 7A illustrates cells of a one-dimensional sense array, according to one embodiment. FIG. 7B illustrates cells of a two-dimensional sense array, according to one embodiment. FIG. 7C illustrates cells of a two-dimensional sense array, according to another embodiment.

In FIG. 7A in one embodiment, cells 700 represent an intersection of sense elements (e.g., electrodes) of the capacitive sense array 125. In one embodiment, processing logic is configured to detect one or more touches on capacitive sense array 125. The one or more touches produces touch data on the capacitive sense array 125, and the processing logic measures the touch data. The touch data may be represented as multiple cells (e.g., cells 700), each cell (e.g., $S_{0x}$-$S_{4x}$) representing an intersection of sense elements of capacitive sense array 125. In FIG. 7A, cells marked $S_{0x}$-$S_{4x}$ represent names identifying cells. In one embodiment, the names $S_{0x}$-$S_{4x}$ represent locations of cells corresponding to capacitive sense array 125. For example, cells 700 may represent a row of cells in the Y-direction. In another embodiment, one or more touches on a capacitive sense array 125 produce touch data on cells 700 and the touch data can be represented as counts (not shown). The cell most proximate the touch may produce the highest count. In another embodiment, multiple cells may have a high count. In FIG. 7A, cell $S_{2x}$ has the highest count of cells $S_{0x}$-$S_{4x}$ and thus is represented as the local maximum 701. Said differently, the local maximum 701 has the highest count for all the cells 700 of capacitive sense array 125. For example, as a result of a touch, $S_{2x}$ may have a count of 300 while $S_{0x}$, $S_{1x}$, $S_{3x}$, and $S_{4x}$, have counts of 150. Continuing with the example, $S_{2x}$ is considered the local maximum 701 because it has the highest count of all the cells 700 in capacitive sense array 125.

Returning to method 600, in block 605 processing logic identifies from the touch data a local maximum, the local maximum corresponding to a cell of multiple cells with the maximum count. A local maximum is illustrated in FIG. 7A as local maximum 701, in FIG. 7B as local maximum 711, and FIG. 7C as local maximum 721.

In block 610 of method 600, processing logic identifies a first set of adjacent cells, adjacent to the local maximum in a first direction, and a second set of adjacent cells, adjacent to the local maximum in second direction. Returning to FIGS. 7A and 7B for purposes of illustration. In FIG. 7A, cells $S_{0x}$ and $S_{1x}$ are adjacent to the local maximum 701 in a first direction, and cells $S_{3x}$ and $S_{4x}$ are adjacent to the local maximum 701 in a second direction. FIG. 7B shows an example of cells on which BR1 (3×3 matrix) is applied. In FIG. 7B, cells $S_{11}$, $S_{12}$, and $S_{13}$ are adjacent to local maximum 711 in a first direction and cells $S_{31}$, $S_{32}$, and $S_{33}$ are adjacent to local maximum 711 in a second direction.

In block 615 of method 600, processing logic calculates a first summation, the first summation comprising a summation of touch data for the first set of adjacent cells. Returning to FIGS. 7A, 7B, 7C for purposes of illustration. In FIG. 7A, the summation of the first set of adjacent cells is $S_{0x}+S_{1x}$. In FIG. 7B, the summation of the first set of adjacent cells is the summation of the entire column, for example $S_{1x}=S_{11}+S_{12}+S_{13}$. FIG. 7C shows an example of cells on which a BR algorithm (BR2) for a 5×5 matrix is applied. In FIG. 7C, the summation of the first set of adjacent cells to the local maximum 721 is shown in the following equations:

$$S_{0x} = \sum_{i=0}^{4} S_{0i}, \qquad \text{Eq. 2}$$

$$S_{1x} = \sum_{i=0}^{4} S_{1i} \qquad \text{Eq. 3}$$

In block 620 of method 600, processing logic calculates a second summation, the second summation comprising a summation of touch data for the second set of adjacent cells. Returning to FIGS. 7A, 7B, 7C for purposes of illustration. In FIG. 7A, the summation of the second set of adjacent cells is $S_{3x}$, $S_{4x}$. In FIG. 7B, the summation of the first set of adjacent cells is the summation of the entire column, for example $S_{3x}=S_{31}+S_{32}+S_{33}$. FIG. 7C shows an example of cells on which a BR algorithm (BR2) for a 5×5 matrix is applied. In FIG. 7C, the summation of the first set of adjacent cells to the local maximum 721 is shown in the following equations:

$$S_{3x} = \sum_{i=0}^{4} S_{3i}, \qquad \text{Eq. 4}$$

$$S_{4x} = \sum_{i=0}^{4} S_{4i} \qquad \text{Eq. 5}$$

In block 625 of method 600, processing logic calculates a local maximum summation. Returning to FIGS. 7A, 7B, 7C for purposes of illustration. In FIG. 7A, the local maximum summation is the count of $S_{2x}$. In FIG. 7B, the local maximum summation is the summation of the entire column, for example $S_{2x}=S_{21}+S_{22}+S_{23}$. FIG. 7C shows an example of cells on which a BR algorithm (BR2) for a 5×5 matrix is applied. In FIG. 7C, the summation of the first set of adjacent cells to the local maximum 721 is shown in the following equation:

$$S_{2x} = \sum_{i=0}^{4} S_{2i} \qquad \text{Eq. 6}$$

In block 630 of method 600, processing logic calculates a numerator, the numerator comprising the second summation less the first summation. Returning to FIGS. 7A, 7B, 7C for purposes of illustration. In FIG. 7A, the numerator is represented in the following equation:

$$\text{numerator}=(S_{3x}+S_{4x})-(S_{0x}+S_{1x}) \qquad \text{Eq. 7}$$

In FIG. 7B, the numerator is represented in the following equation:

$$\text{numerator}=(S_{3x}-S_{1x}) \qquad \text{Eq. 8}$$

In FIG. 7C, the numerator is represented in the following equation:

$$\text{numerator}=(S_{3x}+S_{4x})-(S_{0x}+S_{1x}) \qquad \text{Eq. 9}$$

In block 635 of method 600, processing logic divides the numerator by a first denominator when the first summation is greater than the second summation. The first denominator includes a summation of the local maximum and the touch data of the nearest adjacent cell of the first set of adjacent cells less the touch data of a furthest adjacent cell of the second set of adjacent cells. In contrast, in block 640 of method 600, processing logic divides the numerator by a second denominator when the first summation is less than or equal to the second summation. A second denominator includes a summation of the local maximum summation and the touch data of the nearest adjacent cells of the second set of adjacent cells less the touch data of the furthest adjacent cell of the first set of adjacent cells. Returning to FIGS. 7A, 7B, 7C for purposes of illustration. In FIG. 7A, the block 635 and block 640 are represented in the following mathematical representations:

$$x_0 = \frac{\text{numerator}}{\text{denominator}}$$

If $(S_{0x}+S_{1x}) > (S_{3x}+S_{4x})$ $$\text{denominator}=S_{2x}+S_{1x}-S_{4x},$$

Else, $$\text{denominator}=S_{2x}+S_{3x}-S_{0x}.$$

In FIG. 7B, block 635 and block 640 are represented in the following mathematical representations:
If $(S_{1x} > S_{3x})$ $$x_0 = \frac{\text{numerator}}{\text{denominator}} = \frac{S_{3x}-S_{1x}}{S_{2x}+S_{1x}-S_{3x}}$$

Else $$x_0 = \frac{\text{numerator}}{\text{denominator}} = \frac{S_{3x}-S_{1x}}{S_{2x}+S_{3x}-S_{1x}}$$

In FIG. 7C, block 635 and block 640 are represented in the following mathematical representations:
If $(S_{0x}+S_{1x})>(S_{3x}+S_{4x})$ $$x_0 = \frac{\text{numerator}}{\text{denominator}} = \frac{S_{3x}+S_{4x}-(S_{0x}+S_{1x})}{S_{2x}+S_{1x}-S_{4x}}$$

Else $$x_0 = \frac{\text{numerator}}{\text{denominator}} = \frac{S_{3x}+S_{4x}-(S_{0x}+S_{1x})}{S_{2x}+S_{3x}-S_{0x}}$$

In FIG. 6, method 600 illustrates the calculation of a BR weight, according to one embodiment. In one embodiment, a BR weight may be used as a variable in a BR position calculation equation in order to determine, with more precision, the position of touch. A BR weight can be determined for matrices of various sizes, for example 3×3, 5×5, 7×7, 9×9, etc., using the method disclosed.

Figure 8:
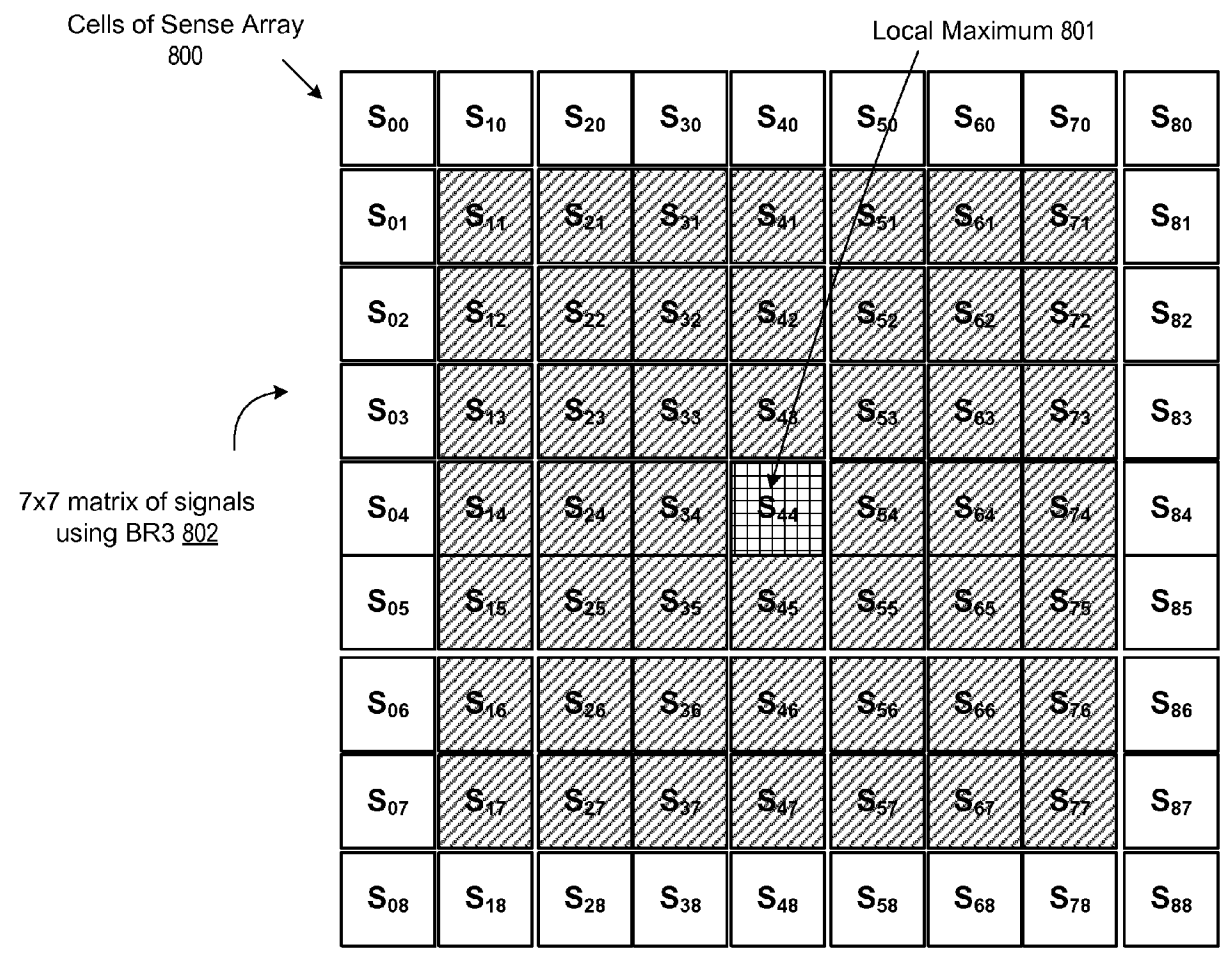

FIG. 8 illustrates cells of a two-dimensional sense array, according to one embodiment. In one embodiment, a BR position calculation algorithm may be performed on the cell matrix as presented in FIG. 8, using the BR position calculation algorithm described above in FIG. 6. FIG. 8 represents cells 800 of a sense array, for example sense array 125, on which a BR algorithm is performed on a 7×7 matrix (BR3).

The position calculation algorithms, Gradients, Centre of Mass (CoM) (a.k.a., Centroid), Linear Interpolation, Gaussian Approximation, and Parabolic Estimator are known by those skilled in the art and will not be discussed in detail.

The methods described above regarding position calculation can be implemented by the position calculation tool 120, which may be implemented in a capacitive touch screen controller. In one embodiment, the capacitive touch screen controller is the TrueTouch® capacitive touchscreen controller, such as the CY8CTMA3xx family of TrueTouch® Multi-Touch All-Points touchscreen controllers, developed by Cypress Semiconductor Corporation of San Jose, Calif. The TrueTouch® capacitive touchscreen controllers sensing technology to resolve touch locations of multiple fingers and a stylus on the touch-screens, supports operating systems, and is optimized for low-power multi-touch gesture and all-point touchscreen functionality. Alternatively, the touch position calculation features may be implemented in other touchscreen controllers, or other touch controllers of touch-sensing devices. In one embodiment, the touch position calculation features may be implemented with other touch filtering algorithms as would be appreciated by one of ordinary skill in the art having the benefit of this disclosure.

The embodiments described herein may be used in sense arrays used in mutual capacitance sensing systems, or in self-capacitance sensing systems, or combinations thereof. In one embodiment, the capacitance sensing system detects multiple sense elements that are activated in the array, and can analyze a signal pattern on the neighboring sense elements to separate noise from actual signal. The embodiments described herein are not tied to a particular capacitive sensing solution and can be used as well with other sensing solutions, including optical sensing solutions, as would be appreciated by one of ordinary skill in the art having the benefit of this disclosure.

Figure 9:
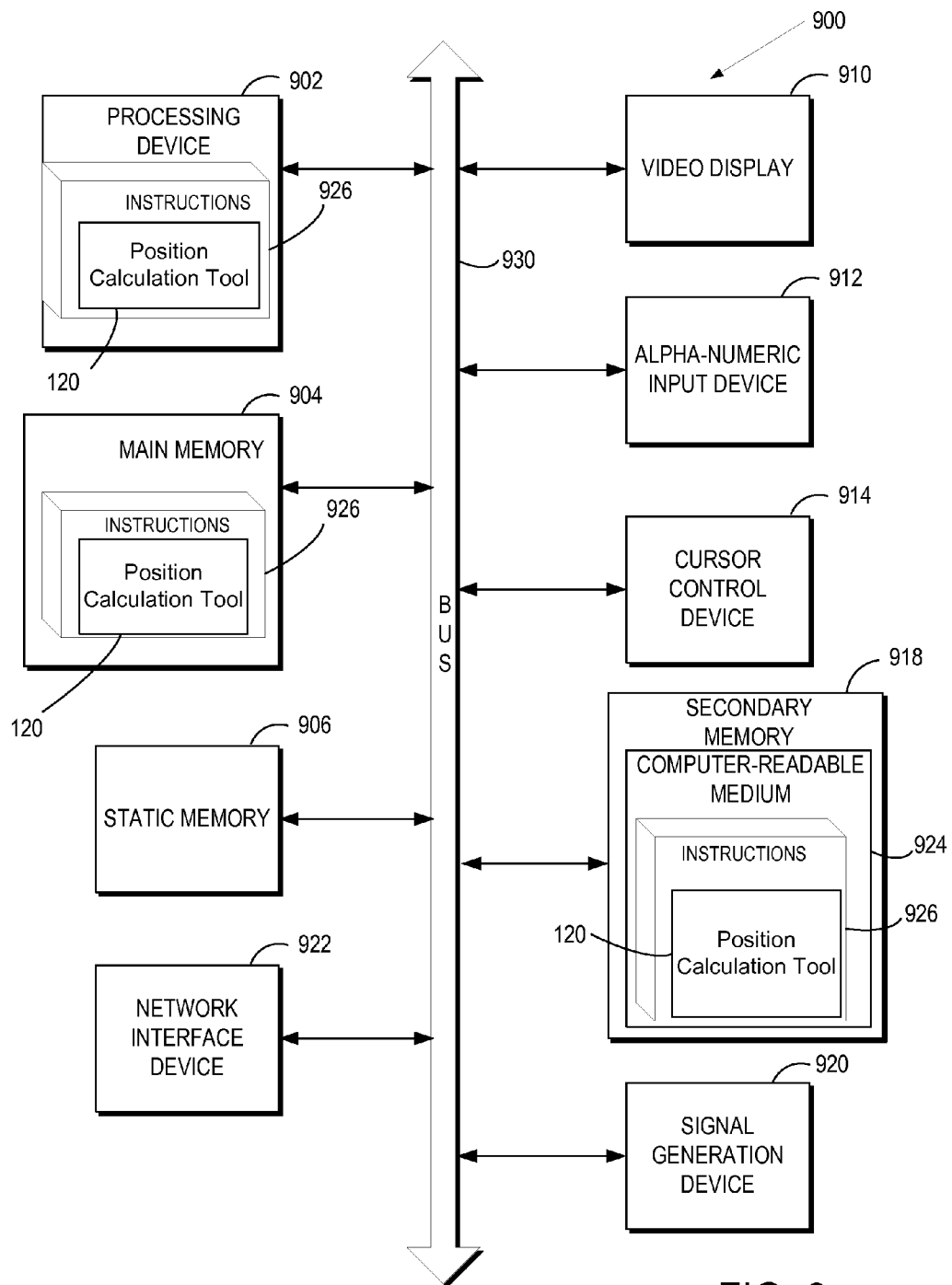
FIG. 9 is a diagram of one embodiment of a system for position calculation.

FIG. 9 is a diagram of one embodiment of a system for position calculation. Within the computer system 900 is a set of instructions for causing the machine to perform any one or more of the methodologies discussed herein. In alternative embodiments, the machine may be connected (e.g., networked) to other machines in a LAN, an intranet, an extranet, or the Internet. The machine can be a host in a cloud, a cloud provider system, a cloud controller or any other machine. The machine can operate in the capacity of a server or a client machine in a client-server network environment, or as a peer machine in a peer-to-peer (or distributed) network environment. The machine may be a personal computer (PC), a tablet PC, a console device or set-top block (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 900 includes a processing device 902 (e.g., host processor 150 or processing device 110 of FIG. 1), a main memory 904 (e.g., read-only memory (ROM), flash memory, dynamic random access memory (DRAM) such as synchronous DRAM (SDRAM) or DRAM (RDRAM), etc.), a static memory 906 (e.g., flash memory, static random access memory (SRAM), etc.), and a secondary memory 918 (e.g., a data storage device in the form of a drive unit, which may include fixed or removable computer-readable storage medium), which communicate with each other via a bus 930.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. Processing device 902 is configurable to execute the instructions 926 for performing the operations and steps discussed herein.

The computer system 900 may further include a network interface device 922. The computer system 900 also may include a video display unit 910 (e.g., a liquid crystal display (LCD) or a cathode ray tube (CRT)) connected to the computer system through a graphics port and graphics chipset, an alphanumeric input device 912 (e.g., a keyboard), a cursor control device 914 (e.g., a mouse), and a signal generation device 920 (e.g., a speaker).

The secondary memory 918 may include a machine-readable storage medium (or more specifically a computer-readable storage medium) 924 on which is stored one or more sets of instructions 926 embodying any one or more of the methodologies or functions described herein. In one embodiment, the instructions 926 include instructions for the position calculation tool 120. The instructions 926 may also reside, completely or at least partially, within the main memory 904 and/or within the processing device 902 during execution thereof by the computer system 900, the main memory 904 and the processing device 902 also constituting machine-readable storage media.

The computer-readable storage medium 924 may also be used to store the instructions 926 persistently. While the computer-readable storage medium 924 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 926, components and other features described herein can be implemented as discrete hardware components or integrated in the functionality of hardware components such as ASICS, FPGAs, DSPs or similar devices. In addition, the instructions 926 can be implemented as firmware or functional circuitry within hardware devices. Further, the instructions 926 can be implemented in any combination of hardware devices and software components.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "selecting," "identifying," "generating," "calculating," "obtaining," "receiving," "dividing," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may include a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
obtaining, at a processing device, touch data of a sense array, wherein the touch data is for a touch detected proximate the sense array, and wherein the touch data represented as a plurality of cells;
detecting noise on the sense array based on the touch data;
selecting a position calculation algorithm from a plurality of different position calculation algorithms based on the detected noise; and
determining a position of the touch based on the selected position calculation algorithm.

2. The method of claim 1, wherein the selecting the position calculation algorithm comprises:
identifying from the touch data a touched region from among a plurality of regions of the sense array based on a touch proximate to the sense array; and
selecting the position calculation algorithm from the plurality of different position calculation algorithms based on the identified touched region where the touch occurred.

3. The method of claim 2, wherein the plurality of regions of the sense array comprises a plurality of region types comprising at least of a first edge type, a second edge type, a corner type, and a central type, wherein the selecting the position calculation algorithm further comprises:
selecting a first one of the plurality of different position algorithms when the touched region is the first edge type;
selecting a second one of the plurality of different position algorithms when the touched region is the second edge type;
selecting a third one of the plurality of different position algorithms when the touched region is the corner type; and
selecting a fourth one of the plurality of different position algorithms when the touched region is the central type.

4. The method of claim 1, wherein the plurality of different position calculation algorithms comprises at least one of a Gradients, Blais Rioux (BR), Centre of Mass (CoM), Linear Interpolation, Gaussian Approximation, or Parabolic Estimator.

5. The method of claim 1, wherein the selected position calculation algorithm comprises:
generating a Blais Rioux (BR) weight based on the touch data of a touch detected proximate to the sense array; and
determining a position of the touch based the BR weight.

6. The method of claim 5, wherein the generating the BR weight comprises:
identifying from the touch data a local maximum, the local maximum corresponding to a cell of the plurality of cells with maximum touch data;
identifying a first set of adjacent cells adjacent to the local maximum in a first direction and a second set of adjacent cells adjacent to the local maximum in a second direction;
calculating a first summation, the first summation comprising a summation of the touch data for the first set of adjacent cells;
calculating a second summation, the second summation comprising a summation of the touch data of the second set of adjacent cells;
calculating a local maximum summation, the local maximum summation comprising at least the touch data for the local maximum;
calculating a numerator, the numerator comprising the second summation less the first summation;
dividing the numerator by a first denominator when the first summation is greater than the second summation, the first denominator comprising a summation of the local maximum summation and the touch data of a nearest adjacent cell of the first set of adjacent cells less the touch data of a furthest adjacent cell of the second set of adjacent cells; and
dividing the numerator by a second denominator when the first summation is less than or equal to the second summation, the second denominator comprising a summation of the local maximum summation and the touch data of a nearest adjacent cells of the second set of adjacent cells less the touch data of a furthest adjacent cell of the first set of adjacent cells.

7. The method of claim 6, wherein the generating the BR weight further comprises,
identifying a third set of adjacent cells adjacent to the local maximum in a third direction and a fourth direction, and wherein calculating the local maximum summation further comprises the summation of the touch data for the third set of adjacent cells.

8. The method of claim 5, wherein generating the BR weight further comprises:
generating a first BR weight for a first axis; and
generating a second BR weight for a second axis, the first and second axis corresponding to the sense array.

9. The method of claim 8, wherein determining the position further comprises determining the position based on the first BR weight and the second BR weight.

10. An apparatus comprising:
a capacitance-sensing circuit configured to measure touch data of a sense array, wherein the touch data is for a touch detected proximate the sense array, and wherein the touch data represented as a plurality of cells; and
a processing core, coupled to the capacitance-sensing circuit, the processing core to execute a position calculation tool, wherein the position calculation tool is configurable to:
obtain the touch data of the sense array;
detect noise on the sense array based on the touch data;
select a position calculation algorithm from a plurality of different position calculation algorithms based on the detected noise; and
determine a position of the touch based on the selected position calculation algorithm.

11. The apparatus of claim 10, wherein the position calculation tool is further configurable to:
identify from the touch data a touched region from among a plurality of regions of the sense array based on a touch proximate to the sense array; and
select the position calculation algorithm from the plurality of different position calculation algorithms based on the identified touched region where the touch occurred.

12. The apparatus of claim 11, wherein the plurality of regions of the sense array comprises a plurality of region types comprising at least of a first edge type, a second edge type, a corner type, and a central type, wherein the processing device is further configurable to select the position calculation algorithm further to:
  select a first one of the plurality of different position algorithms when the touched region is the first edge type;
  select a second one of the plurality of different position algorithms when the touched region is the second edge type;
  select a third one of the plurality of different position algorithms when the touched region is the corner type; and
  select a fourth one of the plurality of different position algorithms when the touched region is the central type.

13. The apparatus of claim 10, wherein the plurality of different position calculation algorithms comprise at least one of a Gradients, Blais Rioux (BR), Centre of Mass (CoM), Linear Interpolation, Gaussian Approximation, or Parabolic Estimator.

14. The apparatus of claim 10, wherein the position calculation tool is further configurable to:
  generate a Blais Rioux (BR) weight based on the touch data of a touch detected proximate to the sense array,
  determine a position of the touch based the BR weight.

15. The apparatus of claim 14, wherein to generate the BR weight comprises:
  identify from the touch data a local maximum, the local maximum corresponding to a cell of the plurality of cells with maximum touch data;
  identify a first set of adjacent cells adjacent to the local maximum in a first direction and a second set of adjacent cells adjacent to the local maximum in a second direction;
  calculate a first summation, the first summation comprising a summation of the touch data for the first set of adjacent cells;
  calculate a second summation, the second summation comprising a summation of the touch data of the second set of adjacent cells;
  calculate a local maximum summation, the local maximum summation comprising at least the touch data for the local maximum;
  calculate a numerator, the numerator comprising the second summation less the first summation;
  divide the numerator by a first denominator when the first summation is greater than the second summation, the first denominator comprising a summation of the local maximum summation and the touch data of a nearest adjacent cell of the first set of adjacent cells less the touch data of a furthest adjacent cell of the second set of adjacent cells; and
  divide the numerator by a second denominator when the first summation is less than or equal to the second summation, the second denominator comprising a summation of the local maximum summation and the touch data of a nearest adjacent cells of the second set of adjacent cells less the touch data of a furthest adjacent cell of the first set of adjacent cells.

16. The apparatus of claim 15, wherein to generate the BR weight further comprises,
  identify a third set of adjacent cells adjacent to the local maximum in a third direction and a fourth direction, and wherein calculating the local maximum summation further comprises the summation of the touch data for the third set of adjacent cells.

17. The apparatus of claim 14, wherein to generate the BR weight further comprises:
  generate a first BR weight for a first axis; and
  generate a second BR weight for a second axis, the first and second axis corresponding to the sense array.

18. The apparatus of claim 17, wherein to determine the position further comprises determining the position based on the first BR weight and the second BR weight.

19. A system comprising:
  a capacitive sense array configured to generate touch data for a touch detected proximate to the capacitive sense array, the touch data represented as a plurality of cells; and
  a processing device coupled to the capacitive sense array, wherein the processing device is to determine noise on the capacitive sense array based on the touch data, the processing device further to select one or more position calculation algorithms from a plurality of different position calculation algorithms based on the noise, and the processing device further to determine a position of the touch based on the selected position calculation algorithm.

20. The system of claim 19, wherein the processing device is further to:
  determine a region of the capacitive sense array where the touch occurred based on the touch data; and
  select one or more position calculation algorithms from the plurality of different position calculation algorithms based on the region of the capacitive sense array where the touch occurred.

* * * * *